C. H. KLOSTER & F. G. BLATTER.
ORNAMENTAL GLASS WORK.
APPLICATION FILED AUG. 5, 1910.

999,112. Patented July 25, 1911.

Witnesses.
Harry Davis.
P. Shee

Inventors.
C. H. Kloster & F. G. Blatter

UNITED STATES PATENT OFFICE.

CHARLES HENRI KLOSTER AND FRÉDÉRIC GEORGES BLATTER, OF MONTREAL, QUEBEC, CANADA.

ORNAMENTAL GLASS-WORK.

999,112. Specification of Letters Patent. Patented July 25, 1911.

Application filed August 5, 1910. Serial No. 575,810.

*To all whom it may concern:*

Be it known that we, CHARLES HENRI KLOSTER and FRÉDÉRIC GEORGES BLATTER, both residents of 173 Edward Charles street, in the city and district of Montreal, in the Province of Quebec, in the Dominion of Canada, citizens of the Republic of France, have invented certain new and useful Improvements in Ornamental Glass-Work, of which the following is a specification.

The invention relates to improvements in ornamental glasswork, as described in the present specification and illustrated in the accompanying drawings that form part of the same.

The invention consists essentially of the novel construction and arrangement whereby a great variety of designs are made by introducing between two plates of glass in the form of a design, a great number of particles of suitable material and securing said particles firmly in place.

The objects of the invention are to produce at a reasonable cost highly ornate designs in glasswork for windows, panels, and other purposes, and generally to devise a simple and effective glass ornamentation.

Figure 1:
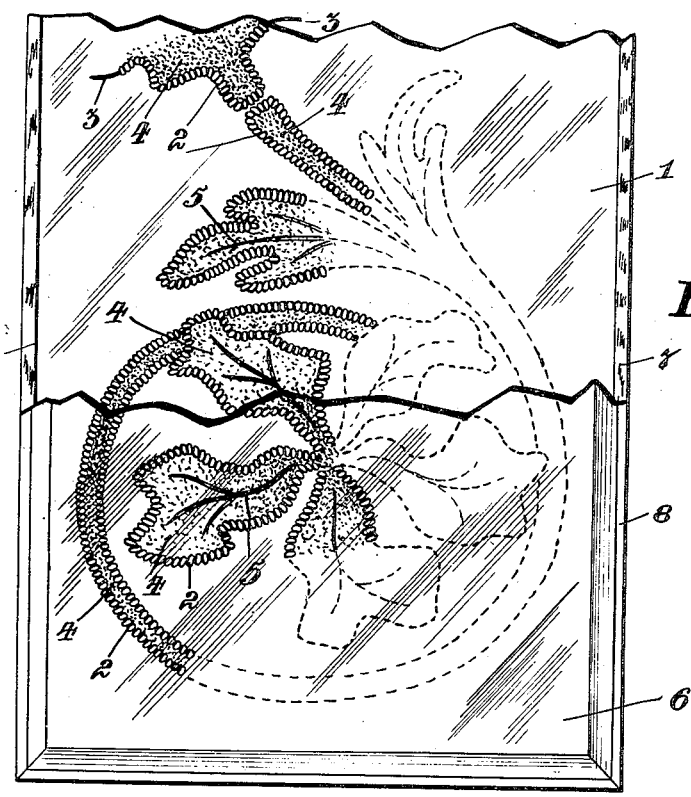
Figure 2:
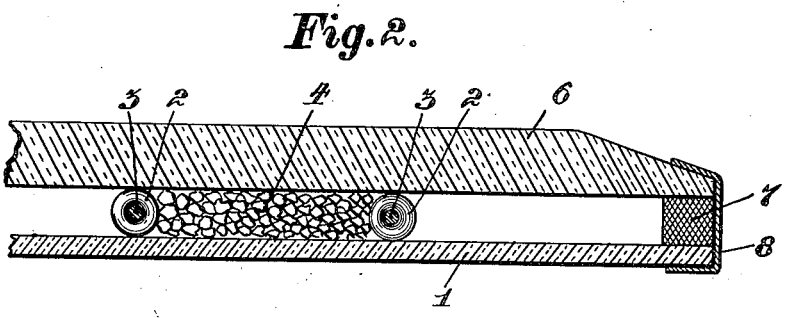

In the drawings, Figure 1 is a plan view of a portion of a glass panel showing the covering plate of glass, partially broken away. Fig. 2 is an enlarged cross sectional view of a portion of two plates of glass, showing the particles therebetween.

Like numerals of reference indicate corresponding parts in each figure.

Referring to the drawings, 1 is the base plate of glass or other suitable material.

2 are beads preferably of colored glass and strung on the wires 3, said wires being stained a suitable color to correspond with the color of the beads and arranged in the design which it is intended shall be shown, said strings of beads being attached to the base plate 1 by a suitable adhesive, preferably a transparent glue.

4 are particles preferably of colored glass and filling in the space bounded by the said strings of beads, said particles being attached to the base plate 1 and to one another by a suitable adhesive, such as transparent glue.

5 indicates an imitation of a vein of a leaf preferably made of a sliver of metal or of fine wire, though it may be of any suitable material.

Generally it must be understood that the particles, beads, veins or other parts making up the design may be of any material which will lend itself to ornamentation, the salient feature in this part of the invention being the mounting and attaching of the said materials on a glass plate in the form of a suitable design.

6 is a cover plate of glass or suitable transparent material and extending over the said base plate and consequently over the design.

7 is a felt filling strip between the glass plates 1 and 6, adjacent to the edge thereof and of a thickness corresponding to the size of the beads 2.

8 is a binding of any suitable material around the edges of the plates 1 and 6.

The plates 1 and 6 shall, of course, in almost every instance be made of glass, both transparent, but it may be that in some designs, one plate may be opaque, that is the base plate, or partially opaque to suit the design, and further other transparent material than glass may be used, however, as aforesaid, the most practical form of the invention will always be that where two transparent plates of glass are used.

What we claim as our invention is:

The combination, with a glass plate, of an outline of stringed glass beads secured by suitable adhesive to the plate, and a filling of glass particles within the outline formed by the stringed beads, also secured by adhesive to the plate, and metal slivers embedded in said filling to represent veins.

Signed at Paris, France, this sixteenth day of July 1910.

CHARLES HENRI KLOSTER.

Witnesses:
H. C. COXE,
G. B. FONDA.

Signed at Montreal, Canada, this thirtieth day of June, 1910.

FRÉDÉRIC GEORGES BLATTER.

Witnesses:
HARRY DAVIS,
P. SHEE.